July 4, 1950        H. A. OMLEY        2,513,958

ELECTRIC INSULATING BUSHING AND GLASS THEREFOR

Filed Aug. 17, 1949

Inventor:
Herbert A. Omley,
by *Arthur Cohen*.
His Attorney.

Patented July 4, 1950

2,513,958

UNITED STATES PATENT OFFICE 2,513,958

ELECTRIC INSULATING BUSHING AND GLASS THEREFOR

Herbert A. Omley, East Nassau, N. Y., assignor to General Electric Company, a corporation of New York Application August 17, 1949, Serial No. 110,713

12 Claims. (Cl. 174—152)

This invention relates to glass electrical devices. More particularly, it relates to electric devices such as insulating bushings and the like and to the glass used in such devices.

A major problem in connection with electrical glasses out of which glass bushings are cast has been to achieve a high degree of adhesion or sealing between the glass insulator element and the metal alloy parts of the bushing assembly. Heretofore, considerable trouble has been experienced with lead-containing glasses in that ferrous alloys and lead glass tend to react chemically. This results in the deposition of metallic lead on the surface of the ferrous metal and produces poor adhesion between the metal and the glass. It has been proposed to protectively precoat the metal parts to prevent lead deposition, but such operations are costly and time-consuming. It has also been proposed to use a glass composition such as that disclosed in the application of U. W. Grigorieff, Serial No. 772,933, filed September 9, 1947, now Patent No. 2,478,626, and assigned to the same assignee as the present invention. The glasses disclosed therein have no lead and, hence, avoid the defect outlined above which had previously been experienced. However, the beneficial effects of the above leadless glass are accomplished only at the expense of using relatively large quantities of expensive lithium oxide-producing materials.

An object of this invention is to provide a bushing glass of desirable electrical and physical characteristics which may be made from readily available raw materials.

Another object of this invention is to provide a bushing of lead-containing insulating glass which will provide a permanent weather-resistant glass to metal seal with iron-nickel alloy.

Another object of the present invention is to provide a glass such that it will form a fluid-tight seal with an alloy containing 41 to 43 percent nickel and 57 to 59 percent iron.

Figure 1:
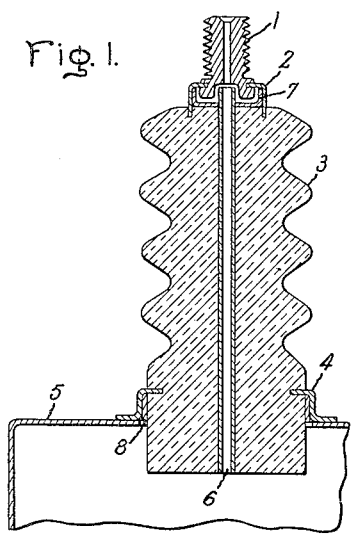
Figure 2:
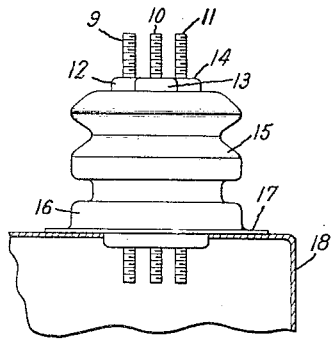
Figure 3:
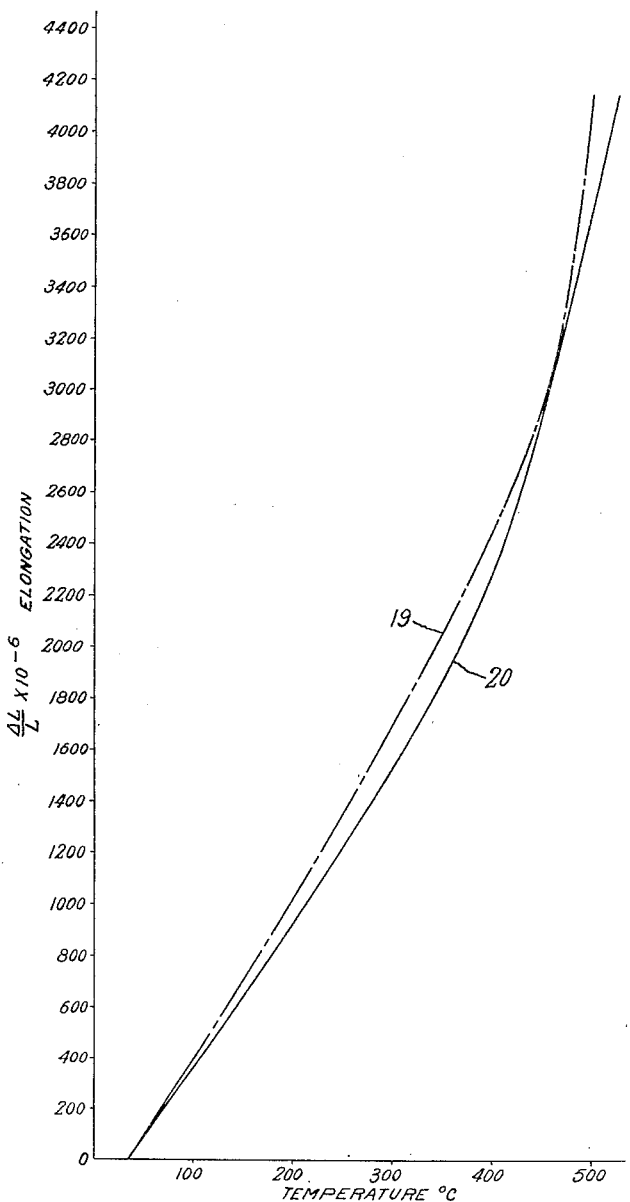

Other objects will become apparent from a consideration of the following description and the drawing, in which Fig. 1 is a longitudinal cross section view of an electric bushing; Fig. 2 is a side elevation view of another type of electric bushing; and Fig. 3 is a graph showing the coefficient of elongation of the glass and metal parts of such bushings.

It has been found that the foregoing objects of the invention may readily be accomplished by employing in the manufacture of electric bushings having metal fittings of about 57–59 percent iron-41 to 43 percent nickel alloy and characterized by permanent weather-resisting glass to metal seals a glass consisting substantially of about 56 to 62 percent silica, 19.5 to 24 percent boric oxide, 2 to 3 percent lithium oxide, 4.5 to 7 percent sodium oxide, 1 to 4 percent potassium oxide, 3 to 8 percent alumina, 0.1 to 1 percent calcium oxide and 3 to 7 percent lead oxide.

The raw materials, or batch ingredients, which determine the final composition of the glass, are fused and reacted in a suitable glass-making furnace at a temperature in the range of from about 1100° C. to about 1350° C. and preferably at about 1300° C. Heat may be supplied to the mix by any suitable means, but that afforded by an electric furnace is preferred. The time fusion and reaction will vary, depending upon the temperature. At the preferred temperature of 1300° C., twelve hours is sufficient.

The analyses of the glasses produced by the practice of this invention are substantially as follows, all proportions being in percent by weight:

|  | Per cent |
|---|---|
| Silica ($SiO_2$) | 56.0 to 62.0 |
| Boric oxide ($B_2O_3$) | 19.5 to 24.0 |
| Lithium oxide ($Li_2O$) | 2.0 to 3.0 |
| Sodium oxide ($Na_2O$) | 4.5 to 7.0 |
| Potassium oxide ($K_2O$) | 1.0 to 4.0 |
| Alumina ($Al_2O_3$) | 3.0 to 8.0 |
| Calcium oxide (CaO) | 0.1 to 1.0 |
| Lead oxide (PbO) | 3.0 to 7.0 |

The preferred glass has a percent by weight composition substantially as follows:

|  | Per cent |
|---|---|
| Silica ($SiO_2$) | 58.0 |
| Boric acid ($B_2O_3$) | 21.0 |
| Lithium oxide ($Li_2O$) | 2.0 |
| Sodium oxide ($Na_2O$) | 5.5 |
| Potassium oxide ($K_2O$) | 2.4 |
| Alumina ($Al_2O_3$) | 6.0 |
| Calcium oxide (CaO) | 0.1 |
| Lead oxide (PbO) | 5.0 |

The fused glass may be poured directly into molds at a temperature of about 1250° C. to 1300° C., and preferably at about 1280° C. Metal inserts or bodies are placed in the mold and the molten glass poured around them to form an integral product. The metal inserts to be used with the above glass should have a coefficient of linear expansion corresponding to that for an iron-nickel alloy containing 57 percent to 59 percent iron and 41 percent to 43 percent nickel. This alloy has a coefficient of linear expansion of about $5.5 \times 10^{-6}$ to $5.6 \times 10^{-6}$ at from about 25° C. to 300° C. This value matches that of the above glass and insures a permanent fluid tight seal between the glass and metal. Preferably, though not necessarily, the glass part after casting should be annealed.

The glass of the present invention is composed of a balance of constituents, each of which, in addition to producing a desired coefficient of linear expansion, contributes to the workability or other characteristics of the glass. For example, the lithium oxide enhances the wetting ability of the glass and thus contributes to a perfect seal. It also makes the glass more fluid. The lead oxide also promotes fluidity, and, in conjunction with the lithium oxide, enables the glass to be poured through a restricted opening or orifice as small as three-eighths of an inch in diameter at pouring temperatures ranging from about 1250° C. to 1300° C. The calcium oxide counteracts any tendency toward the formation of stones, cords and other like defects in the glass. Weather-resistance of the composition is increased by the presence of alumina in a more substantial amount. The boric oxide contributes to the desirable electrical resistivity and other electrical characteristics, as does the silica.

Typical of the insulating bushings which may be fabricated or molded of the present glass are those shown in Figs. 1 and 2. The bushing illustrated in Fig. 1 includes hollow stud 1, which is threaded as shown at the upper extremity. Stud 1 is brazed or otherwise suitably joined with collar 2 which latter, in turn, is embedded in the glass insulator 3. Also embedded in the glass insulator 3 is the rim of lower collar 4. Collar 4 also serves as a means whereby the entire bushing assembly may be mounted, as by welding, brazing, soldering, etc. to base 5, which may be the container for an electrical device or any other mounting on which it is desired to place the bushing. Metal tube 6, which passes longitudinally through the insulator 3 and is held in position at the upper end by thimble 7, may serve as a conduit for a conductor which is not shown. This conductor may be fixed to the stud 1 in any conventional way. In addition to positioning tube or sleeve 6, thimble 7 serves to shield portions of collar 2 from contact with fused glass during the casting process, thus permitting expansion and contraction of the bushing parts without damage. Shield 8, at the lower end of the insulator, serves a similar purpose with respect to collar 4.

Fig. 2 shows a modified bushing which consists of three terminal studs 9, 10, and 11, which are, respectively, provided with collars 12, 13 and 14. The rims of these collars, as in the case of collars 2 and 4 with respect to insulator 3, are embedded in the cast glass insulator 15. These collars are also provided with shields similar in style and purpose to part 7. Basal collar 16 also has a flange (not shown) which is embedded in glass insulator 15 during casting. Flange 17 of collar 16 is joined by any suitable means known in the art to part 18, which may be the container of a capacitor, transformer, other electrical device, or any desired base.

The glass of the present invention is admirably suited for the purpose described. The coefficient of linear expansion or rate of linear change $$\frac{\Delta L}{L} \times 10^{-6}$$

of the glass, as indicated at 19 in Fig. 3, matches almost perfectly, as indicated at 20, that of the 58 percent iron-42 percent nickel alloy inserts over a wide temperature range. The very slight differences in expansion and contraction characteristics are not sufficient to cause cracking of the glass or other difficulty either during manufacture or use. As a matter of fact, the heat shock of the present bushings is very good. For example, bushings constructed as described and about six inches long were repeatedly heated to 75° C. and suddenly deluged with cold water at a temperature of 15° C. without showing any signs of failure.

The weatherability of the present glass and the glass to metal seals which it forms also contributes to its desirability in the present use.

The electrical characteristics of the glass used in the present bushing lend themselves readily to use in bushings, as will be evident from the tabulation below:

Resistivity _____ $6.0 \times 10^{14}$ ohms/—3 cm.
Dielectric constant _____ 7.15
Power factor _____ 0.15

The bushings of this invention may be used alone or in connection with any of the known gaseous, liquid or solid dielectric media. The metal insert-glass seal has been found to resist gas leakage indefinitely at temperatures ranging from —40° C. to 115° C. The above seals have been found useful in resisting the effects of the halogenated hydrocarbon dielectrics which have more of a deteriorating and leaking tendency than do mineral oils, for example.

In order to provide the maximum protection against deterioration of halogenated hydrocarbon dielectrics used in conjunction with bushings employing the present glass it is preferable, though not necessary, to include in the above glass compositions from 0.5% to 1.0% and preferably about 0.9 percent, by weight, of manganese dioxide ($MnO_2$) and 0.1% to 0.3% and preferably 0.2% iron oxide ($Fe_2O_3$), the PbO content being lowered accordingly. The additives impart an amber-like color to the otherwise greenish glass and prevents any tendency toward decomposition of the above-type dielectrics by sunlight by screening out rays of harmful wavelength without altering the other favorable characteristics of the glass.

What I claim as new and desire to secure by Letters Patent of the United States is:

1. A glass suitable for casting purposes comprising by weight 56 to 62 percent $SiO_2$, 19.5 to 24 percent $B_2O_3$, 2 to 3 percent $Li_2O$, 4.5 to 7 percent $Na_2O$, 1 to 4 percent $K_2O$, 3 to 8 percent $Al_2O_3$, 0.1 to 1 percent CaO and 3 to 7 percent PbO.

2. A glass suitable for casting purposes consisting substantially by weight of 56 to 62 percent $SiO_2$, 19.5 to 24 percent $B_2O_3$, 2 to 3 percent $Li_2O$, 4.5 to 7 percent $Na_2O$, 1 to 4 percent $K_2O$, 3 to 8 percent $Al_2O_3$, 0.1 to 1 percent CaO, 3 to 7 percent PbO and 0.5 to 1.0 percent $MnO_2$.

3. A glass suitable for casting purposes comprising by weight 58 percent $SiO_2$, 21 percent $B_2O_3$, 2 percent $Li_2O$, 5.5 percent $Na_2O$, 2.4 percent $K_2O$, 6 percent $Al_2O_3$, 0.1 percent CaO and 5 percent PbO.

4. A glass suitable for casting purposes consisting by weight substantially of 58 percent $SiO_2$, 21 percent $B_2O_3$, 2 percent $Li_2O$, 5.5 percent $Na_2O$, 2.4 percent $K_2O$, 6 percent $Al_2O_3$, 0.1 percent CaO, 4.1 percent PbO and 0.9 percent $MnO_2$.

5. A glass having a thermal coefficient of expansion of from $5.6 \times 10^{-6}$ comprising by weight 58 percent $SiO_2$, 21 percent $B_2O_3$, 2 percent $Li_2O$, 5.5 percent $Na_2O$, 2.4 percent $K_2O$, 6 percent $Al_2O_3$, 0.1 percent CaO and 5 percent PbO.

6. A glass composition having sufficient fluidity when heated to about 1250° C. to 1300° C. to flow when cast through an orifice of about three-eighths inch diameter and to hermetically seal to metal members consisting of about 57 to 59 percent iron and about 43 to 41 percent nickel, said glass comprising 56 to 62 percent $SiO_2$, 19.5 to 24 percent $B_2O_3$, 2 to 3 percent $Li_2O$, 4.5 to 7 percent $Na_2O$, 1 to 4 percent $K_2O$, 3 to 8 percent $Al_2O_3$, 0.1 to 1 percent CaO and 3 to 7 percent PbO.

7. A glass having approximately the same rate of linear expansion over a temperature range of about 25° C. to 500° C. as an alloy consisting of about 41 to 43 percent nickel and 57 to 59 percent iron and capable of forming a fluid-tight seal with said alloy, comprising by weight 56 to 62 percent $SiO_2$, 19.5 to 24 percent $B_2O_3$, 2 to 3 percent $Li_2O$, 4.5 to 7 percent $Na_2O$, 1 to 4 percent $K_2O$, 3 to 8 percent $Al_2O_3$, 0.1 to 1 percent CaO and 3 to 7 percent PbO.

8. A bushing for an electric device comprising an insulating member of glass comprising 56 to 62 percent $SiO_2$, 19.5 to 24 percent $B_2O_3$, 2 to 3 percent $Li_2O$, 4.5 to 7 percent $Na_2O$, 1 to 4 percent $K_2O$, 3 to 8 percent $Al_2O_3$, 0.1 to 1 percent CaO and 3 to 7 percent PbO and cooperating electric terminal members consisting of an alloy of 41 to 43 percent nickel and 57 to 59 percent iron embedded in part in said glass.

9. A bushing for an electric device comprising an insulating member of glass comprising 58 percent $SiO_2$, 21 percent $B_2O_3$, 2 percent $Li_2O$, 5.5 percent $Na_2O$, 2.4 percent $K_2O$, 6 percent $Al_2O_3$, 0.1 percent CaO and 5 percent PbO and cooperating electrical terminal members consisting of an alloy of 41 to 43 percent nickel and 57 to 59 percent iron embedded in part in said glass.

10. A bushing for electrical purposes having an insulating member of glass comprising the following constituents: 58 percent $SiO_2$, 21 percent $B_2O_3$, 2 percent $Li_2O$, 5.5 percent $Na_2O$, 2.4 percent $K_2O$, 6 percent $Al_2O_3$, 0.1 percent CaO and 5 percent PbO.

11. A bushing for an electric device comprising an insulating member of glass consisting substantially of 56 to 62 percent $SiO_2$, 19.5 to 24 percent $B_2O_3$, 2 to 3 percent $Li_2O$, 4.5 to 7 percent $Na_2O$, 1 to 4 percent $K_2O$, 3 to 8 percent $Al_2O_3$, 0.1 to 1 percent CaO, 3 to 7 percent PbO and 0.5 to 1 percent $MnO_2$ and cooperating electric terminal members consisting of an alloy of 41 to 43 percent nickel and 57 to 59 percent iron embedded in part in said glass.

12. A bushing for electrical purposes having an insulating member of glass containing substantially the following constituents: 58 percent $SiO_2$, 21 percent $B_2O_3$, 2 percent $Li_2O$, 5.5 percent $Na_2O$, 2.4 percent $K_2O$, 6 percent $Al_2O_3$, 0.1 percent CaO and 4.1 percent PbO and 0.9 percent $MnO_2$.

HERBERT A. OMLEY.

No references cited.